Jan. 12, 1965 W. V. ASTRUP ETAL 3,165,151
HEAT-TRANSFER TRUSSED-RADIATOR
Filed April 9, 1962 2 Sheets-Sheet 1

INVENTORS:
WILLIAM V. ASTRUP
DONALD W. CHRISTENSEN
ATT'Y

Jan. 12, 1965   W. V. ASTRUP ET AL   3,165,151
HEAT-TRANSFER TRUSSED-RADIATOR
Filed April 9, 1962   2 Sheets-Sheet 2

INVENTORS:
WILLIAM V. ASTRUP
DONALD W. CHRISTENSEN

ATT'Y.

3,165,151
HEAT-TRANSFER TRUSSED-RADIATOR
William V. Astrup and Donald W. Christensen, Racine, Wis., assignors to Young Radiator Company, Racine, Wis., a corporation of Wisconsin
Filed Apr. 9, 1962, Ser. No. 186,148
2 Claims. (Cl. 165—81)

This invention relates to heat exchangers of the type, generally designated "radiators," wherein the fin-supported tubes have their ends bonded to perforate dish-like headers which are spanned by trussed, channel-shaped, protective and reinforcing side plates.

In radiators of this kind the core is made up of a battery of parallel, closely-spaced, tubes extending through and supporting closely-spaced, thin, transverse fin sheets. The ends of the tubes protrude beyond the opposite outermost fin sheets and are bonded to the perforate portions of the dish-type headers. The dish-type header, it should be explained, is one where the major perforate portion is a rectangular-shaped depression offset by integral rims from an outwardly-extending, bordering, perimetrical flange disposed in a plane parallel with that of the perforate tube-supporting portion.

Generally, the tubes are made of copper or copper alloy and solder bonded to the headers which, as a rule, are made of brass. To provide a more rigid structure in such a radiator it has been a practice to arrange steel plates on opposite sides of the core. Usually, these side plates are channel-shaped and, as a rule, have had their ends bonded to the headers. In the interest of greater strength, brazing is the preferable form of bonding the side plate to the headers.

The soldering of the tube ends to the headers and the brazing of the side plates to the headers always has presented a problem to the manufacturers of these radiators. The problem arises from two facts: (1) soldering is done at temperatures approximately 500° F., whereas brazing is done at temperatures approximately 1200° F., and (2) it is more practical to braze the side plates to the headers after the tubes have been soldered to the headers. However, subjecting the previously, solder-bonded tubes, adjacent the header ends where the side plates are brazed, to the higher temperatures than required for solder bonding hazards the risk of melting some of the solder around the tubes and weakening, if not breaking, the tube-end bonds to the headers.

To overcome this problem it recently became expedient to interpose gussets between the headers and the side plates. This has permitted brazing the gussets to the headers before the tube ends were soldered to the headers and subsequently soldering the side plates to the gussets at points removed from the headers. Such a structuring of a trussed radiator is shown and described in Patent No. 2,932,489.

However, even this trussed structuring of radiators did not completely overcome the problem constantly confronting manufacturers of this type of radiator for diesel locomotives. All too frequently, and after not-too-extended periods of use, these radiators would develop serious leaks at the bonds of the tubes to the headers. Obviously, this forced the supplier to repair or replace the defective units.

Studies and tests were undertaken to try to discover the cause of these all-too-frequent defects and a possible remedying thereof. Two facts were apparent. These locomotive radiators are comparatively massive and are subject to temperatures as high as 200° F. This led to the assumption that the expansion differential between the tubes bonded to the headers and the reinforcing side plates and the excessive vibration due to the high speeds at which these locomotives travel might be the primary causes for these recurring defects in the radiators.

The main objects of this invention, therefore, are to provide an improved structuring of radiators which are subject to high-heat transfer and excessive vibration in normal use; to provide an improved form of floating connection of the reinforcing side plates to one of the headers to permit relative movement of the two headers as determined by the expansion characteristics of the battery of tubes bonded to the opposed headers; to provide an improved interfitting relationship of the nested core-protective side plates and the reinforcing side plates to reduce to a minimum vibration that normally tends to cause relative side-wise shifting of the finned tubes and the reinforcing side plates; to provide an improved trussed radiator of this kind comprising elements of such simple form and ease of assembly and bonding as to make for greater economy in production and longer service without repair or replacement of the units; and to provide a radiator of this structuring especially adapted for use in diesel locomotives as currently used on railroads.

Figure 1:
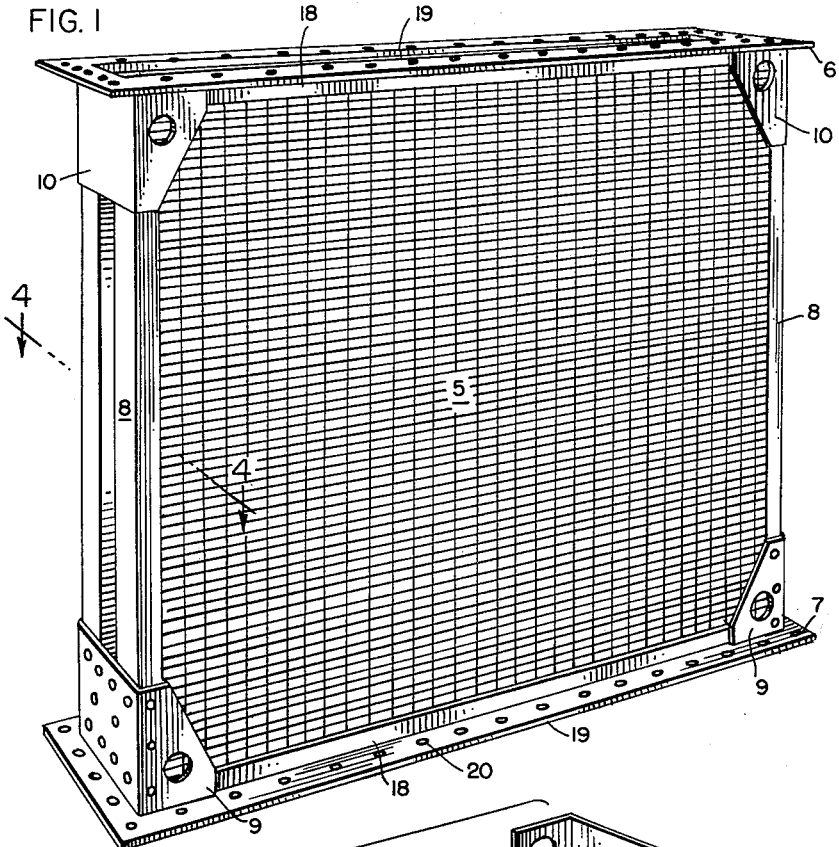
FIG. 1 is a perspective view of a radiator constructed in accordance with this invention.
Figure 2:
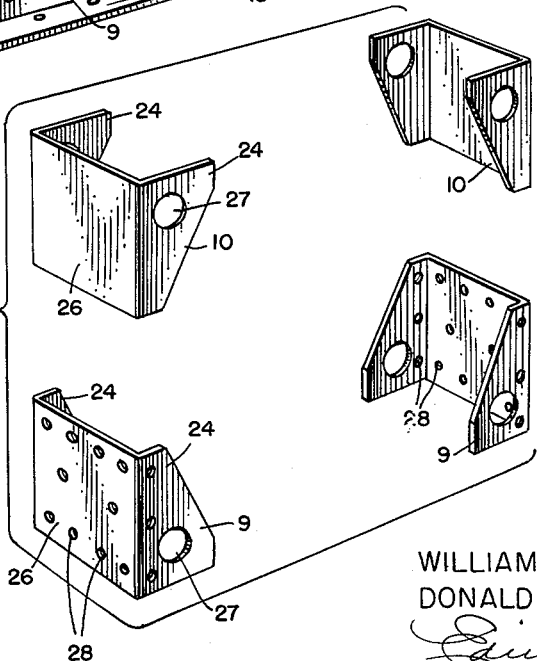
FIG. 2 is an exploded perspective of the two pairs of gussets which are bonded to the respective headers as shown in FIG. 1.
Figure 3:
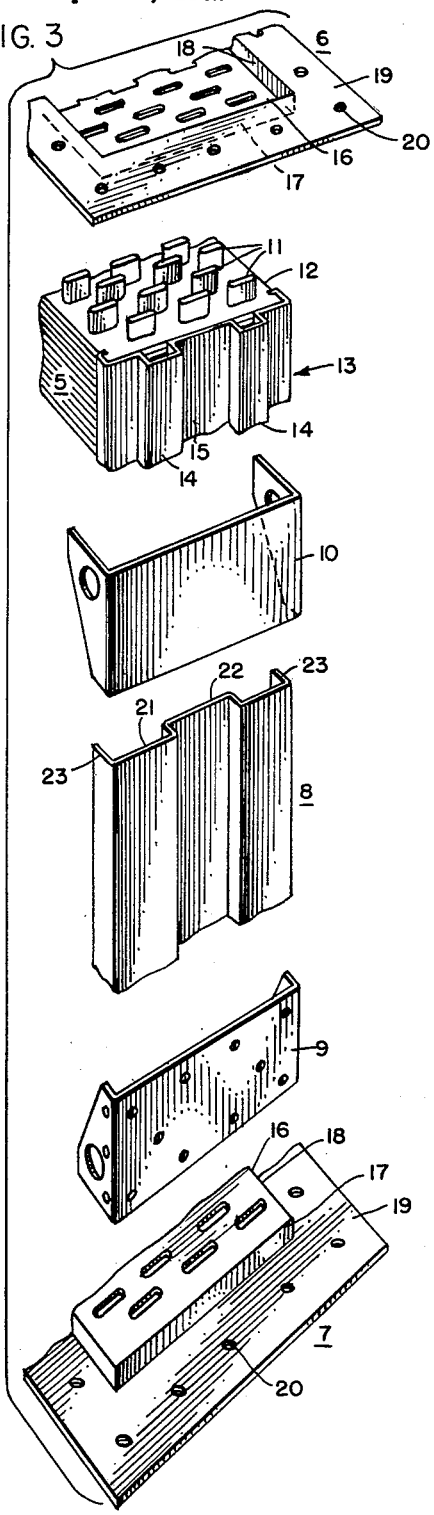
FIG. 3 is an exploded perspective of portions of the several parts which assembled constitute a radiator constructed in accordance with this invention.

The essential concept of this invention involves a radiator wherein the protective side plates are secured along the tube-supported fins and slidably nested in the reinforcing side plates which have one end of each bonded to gussets in turn bonded to one of the headers and the other end of each of which is telescopically seated in the gussets bonded to the other header so as to permit relative movement of the headers under the strain of heat expansion and contraction of the tubes and prevent relative sidewise shifting between the finned-tube core and the side-reinforcing plates.

A radiator embodying the foregoing concept comprises a finned-tube core 5 supported on upper and lower headers 6 and 7 which are spanned by reinforcing side plates 8 differently seated at their opposite ends in opposite pairs of gussets 9 and 10.

The herein-designated core 5 is a conventional unit comprising a battery of tubes 11 held in closely-spaced parallel assembly by a plurality of closely-spaced fin sheets 12 disposed radially of the tubes 11 and having protective side plates 13 bonded along the opposite sides of such an assembly of tubes and fins. Such a structured core 5 is shown and described in Patent No. 2,599,965.

As indicated in that patent and here the tubes 6 are of elongated or substantially elliptical form and are arranged in alternating staggered rows.

The protective side plates 13, in this adaptation, are formed with two longitudinally-extending narrow, channel-shaped offsets 14 along an opposite and wider median offset 15. These offsets 14 and 15 provide for nesting with the reinforcing side plates 8, as will be explained presently.

The upper and lower headers 6 and 7 are of identical form wherein the major apertured portion 16, is offset by integral end and side rims 17 and 18 from a bordering flange 19 having a series of holes 20 for the reception of bolt-and-nut fasteners (not here shown) for mounting the radiator in operative position. Obviously, the plane of the apertured portion 16 is disposed parallel to the plane of the flange 19.

It should be noted here that "upper" and "lower," strictly speaking, has reference primarily to the position in which the radiator is shown in FIG. 1 of the drawings. More often than not, when used in diesel locomotives, these radiators are disposed horizontally. In that case the gussets would be referred to as used at one or the other end of the radiator.

The reinforcing side plates 8, as herein shown, in cross-section form simulate an E by having the base part 21 formed with a medial offset 22 disposed parallel with the perimetrical sides 23. This medial offset 22 is dimensioned to snugly seat in the comparable medial offset 15 in a protective side plate 13 between the offsets 14.

The gussets 9 and 10 are of short U-shape with the outer edges of the parallel wing parts 24 disposed at an angle to the base part 26 and with each wing part 24 having a comparatively large circular opening 27. The lower pair of gussets 9 have groups of apertures 28 formed in the wings 24 and base 26 for receiving knobs of the bonding material when this pair of gussets 6 are bonded to the reinforcing side plates 8, as will be explained presently.

The pair of upper gussets 10 do not have these series of apertures 28, which are present in the lower pair, for very significant reason that the concept for structuring the herein shown radiator provides for the sliding seating of the ends of the reinforcing side plates 8 in the pair of upper gussets 10. This is to permit a relative unrestrained movement of the headers 6 and 7 toward and away from each other in response to the expansion-contraction which takes place in the tubes 11 under the changing temperatures at which these radiators function, especially when used for cooling high-heat engines such as the diesel locomotive.

It has been well-known that the thermal expansion differential between the copper or copper alloys of the tubes 11 and the steel of the reinforcing side plates 8, and the gussets 9 and 10 when used, is in the ratio of 1.50 to 1.00, respectively. However, heretofore, it has been assumed that if the reinforcing side plates 8 were made of heavy enough material and were adequately bonded to the headers 6 and 7 this thermal expansion differential could not be the cause for annoying leaks that too often occurred in these radiators when used on diesel locomotives.

However, extended tests, antecedant to the concept for the herein shown telescopic relationship of the reinforced side plates 8 and the upper pair of gussets 10, gave ample reason for believing that however firmly the reinforcing side plates 8 might be bonded to the header 6 and 7 this thermal expansion differential between these conventionally used metals was, as a matter of fact, the primary cause for the fracturing of the bonds of the tubes 11 to the headers 6 and/or 7 resulting in the annoying and expensive radiator leaks.

Therefore, in the herein-shown radiator, both pairs of gussets 9 and 10 are bonded to the end and side rims 17 and 18 of the respective headers 6 and 7. Preferably this bonding is a conventional brazing operation. The lower ends of the reinforcing side plates 8 are bonded to the respective gussets 9. This is effected by a conventional soldering operation.

The upper ends of the reinforcing side plates 8 are seated in the upper pair of gussets 10, as the lower ends are seated in the lower gussets 9, but the upper ends are not bonded to the gussets 10. Thus this allowance for the relative shifting of the upper ends of the side plate 8 and the gussets 10 permits a relative movement of the headers 6 and 7, axially of the tubes 11, during the alternating expansion and contraction of these tubes under the changing temperature conditions to which the radiator is subjected inevitably.

Figure 4:
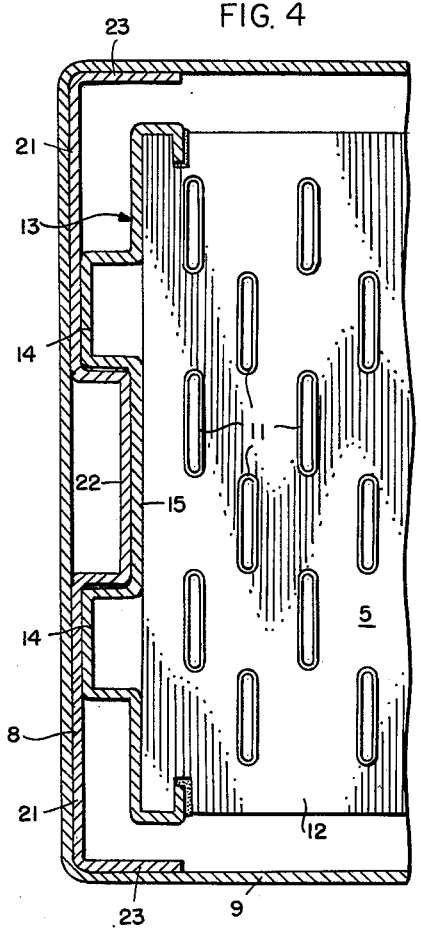
FIG. 4 is an enlarged, fragmentary, transverse-sectional view at one side of this improved radiator taken on the plane of the line 4—4 of FIG. 1.

Because of the high speeds at which these diesel locomotives travel, it has been assumed that the inevitable vibrations in the locomotive might be so communicated to the radiator as to cause some shifting of the core and the reinforcing side plates 8 transversely of the core 5. Such possible shifting, it has been assumed, might be a contributory cause to the radiator leaks. To insure against that possibility, the reinforcing side plates 8 and the core protective side plates 13 have been formed with the hereinshown respective offsets 22 and 14 and 15. These permit a firm nesting of these sets of side plates 8 and 13 as shown in FIG. 4. Therefore, since the reinforcing side plates 8 have been so firmly secured to the headers 6 and 7 by means of the gussets 9 and 10, this nesting of the opposite pairs of side plates 8 and 13 precludes any possible sidewide movement of the core 5 within this supporting framework of the side plates 8, the gussets 9 and 10 and the headers 6 and 7.

A radiator, constructed in accordance with this invention, is assembled in the following manner:

The core 5, with the tubes 11 and fin sheets 12, is assembled in the conventional manner. The headers 6 and 7 and the gussets 9 and 10, likewise, are formed in the usual manner. Moreover, the gussets 9 and 10 are brazed in a conventional manner at the opposite ends of the respective headers 6 and 7.

The first step is to insert the tubes 11, at one end of the core 5, into the apertures in one of the headers 6 or 7 and solder bond the tube end to the apertured depressed portion of the header.

Next the side plates 8 have one end of each inserted into the "lower" pair of gussets 9 and soldered thereto in the conventional manner.

Then the other header has the apertured major portion set over the other ends of the tubes at the same time the other (i.e. "upper") ends of the side plates 8 are inserted into the other pair, (i.e. "upper") gussets 10. Thereupon, the other tube ends are solder bonded to the other header.

Variations and modifications in the details of the structure and arrangement of parts may be resorted to within the spirit and coverage of the appended claims.

I claim:

1. A heat-exchanger trussed-radiator comprising,
   (a) a pair of apertured headers each having a bordering perimetrical flange with the apertured portion of the header offset from the plane of the bordering flange and defined by end and side rims,
   (b) a single battery of tubes arranged in closely-spaced parallel relationship and supporting a series of fins transversely-disposed in closely-spaced relationship with the opposite ends of the tubes bonded in the apertured portion of the respective headers,
   (c) pairs of U-shaped gussets each having the perimeters of the base and parallel wing parts bonded respectively to the end and side rims of the respective headers, and
   (d) a pair of channel-shaped reinforcing side plates extending along the tube-supported fins on opposite sides thereof and each plate having one end bonded to the gussets on one header and each having the other end in sliding embracive contact with the gussets on the other header to permit movement of the headers relative to each other axially of the tubes in response to the alternating heat expansion-contraction of the tubes.

2. A heat-exchanger trussed-radiator as set forth in claim 1 but having in addition, (e) a pair of protective plates each of channel shape embracively positioned and bonded along the opposite sides of the tube-supported fins and nesting within the respective reinforcing side plates, to secure the tube-supported fins against transverse shifting relative to the reinforcing side plates, (f) the reinforcing side plates and the protective side plates having interfitting longitudinal portions oppositely offset to rigidly retain the respective plates against relative shifting transversely thereof.

References Cited by the Examiner
UNITED STATES PATENTS 2,932,489 4/60 Young _____ 165—149
2,933,291 4/60 Huggins _____ 165—149

CHARLES SUKALO, Primary Examiner.

MEYER PERLIN, Examiner.